(No Model.)
T. A. L. MOORE.
TRUSS ROD YOKE.
No. 430,588. Patented June 17, 1890.
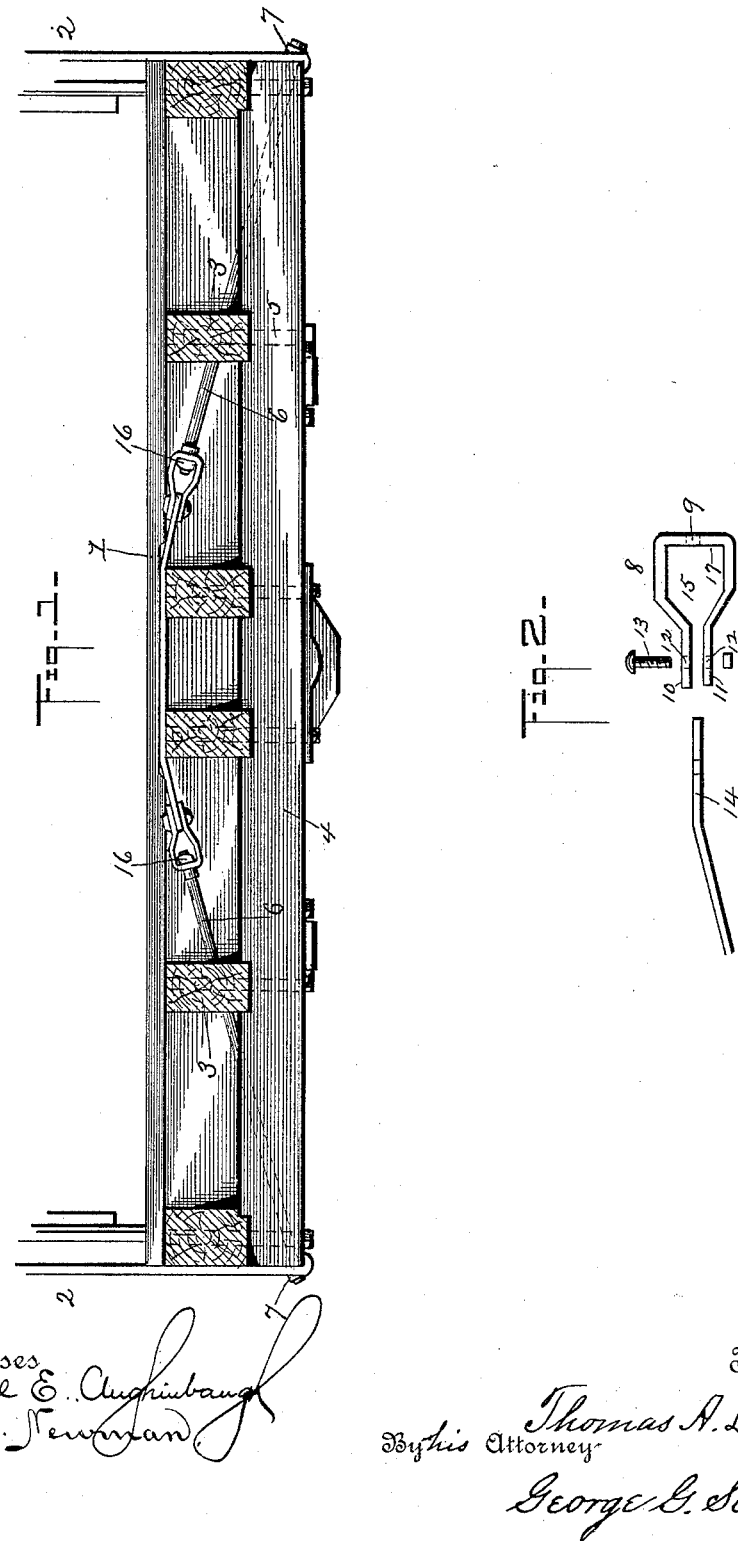
Witnesses
Will E. Aughinbaugh
H. C. Newman
Inventor
Thomas A. L. Moore
By his Attorney
George G. Schroeder

UNITED STATES PATENT OFFICE.

THOMAS A. L. MOORE, OF RICHMOND, VIRGINIA.

TRUSS-ROD YOKE.

SPECIFICATION forming part of Letters Patent No. 430,588, dated June 17, 1890.

Application filed March 22, 1890. Serial No. 344,890. (No model.)

*To all whom it may concern:*

Be it known that I, THOMAS A. L. MOORE, a citizen of the United States, residing at Richmond, in the county of Henrico and State of Virginia, have invented certain new and useful Improvements in Truss-Rod Yokes; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an improvement in truss-rod yokes.

The object of the invention is to produce a yoke that can readily be attached to the truss-rod and truss-strap or detached therefrom and be held in place either by rivets or bolts.

With these objects in view the invention consists, broadly, of a yoke provided with an opening for the admission of a truss-rod and a recess for the truss-rod nut, and also with an opening for securing in place a truss-strap.

The invention further consists in the various novel details of construction of a truss-rod yoke, as will hereinafter be fully described and claimed.

In the accompanying drawings, forming part of this specification, and in which like letters of reference indicate corresponding parts, I have illustrated one form of truss-rod yoke embodying the essential features of my invention, although the same may be carried into effect in other ways without in the least departing from the spirit thereof, and in these drawings—

Figure 1 is a transverse sectional view of a freight-car, showing the truss-rod and truss-straps and my improved yoke connecting the same; and Fig. 2 is an elevation showing more clearly the construction of my improved truss-rod yoke removed from the truss-rod and truss-strap.

Referring to the drawings, 1 designates the floor of an ordinary freight-car; 2, the side walls; 3, the longitudinal beams for supporting the floor; 4, the cross-beams, and 5 the bolts for connecting the cross-beams and longitudinal beams. Extending through one or more of the longitudinal beams is a truss-rod 6, one end of which is secured to the side of the car, as shown at 7, while the opposite end engages with my improved truss-rod yoke 8. This yoke is constructed of wrought or malleable iron, and preferably in the form shown in Fig. 2, and is provided at one end with an aperture 9, through which extends the truss-rod, and the opposite ends 10 and 11 with vertical apertures 12, through which extends a bolt or rivet 13 for holding the truss-straps 14 in place. As shown, only one bolt or rivet is used; but it is obvious that any number may be used to meet the requirements of the case. The opposite end of the yoke to which the truss-strap is connected is formed into a recess 15, the vertical wall 17 of which forms a bearing for the nut 16.

It will readily be seen from the foregoing description that this form of yoke is exceedingly simple of construction, and may be produced at a cost much below the ordinary yoke employed upon freight-cars, while at the same time it will be found equally as efficient and durable in use. Another advantage is that it may be readily removed from the truss-strap and truss-rod by loosening the nut 17 of the truss-rod and then removing the bolt or rivet 13.

I would have it distinctly understood that I do not limit myself to the exact construction shown, but may vary widely therefrom in carrying my invention into effect.

Having thus fully described my invention, what I claim as new, and desire to secure by Letters Patent, is—

In combination, the truss, a yoke consisting of a single piece of metal bent, as described, so as to bring its ends 10 and 11 parallel with each other and form a recess 15 and wall 17, being perforated at 12 and 9, with a truss-rod passing through opening 9, a nut 16 thereon in the recess 15 and having bearing on wall 17, a truss-strap 14, having its end lying between the ends 10 and 11 of the yoke and perforated to register with perforations 12 in these ends, and a bolt passing through such perforations and uniting the strap and yoke, as set forth.

In testimony whereof I affix my signature in presence of two witnesses.

THOS. A. L. MOORE.

Witnesses:
RICHARD W. JONES,
J. Q. DICKINSON.